(12) United States Patent
Taenzer

(10) Patent No.: US 6,285,965 B1
(45) Date of Patent: Sep. 4, 2001

(54) PROCESS AND ARRANGEMENT FOR THE MEASUREMENT OF TAPER THREADS ON A COORDINATE MEASUREMENT DEVICE

(75) Inventor: Wilfried Taenzer, Jena (DE)

(73) Assignee: Optische Koordinatenmesstechnik GmbH, Jena (DE)

( * ) Notice: Subject to any disclaimer, the term of this patent is extended or adjusted under 35 U.S.C. 154(b) by 0 days.

(21) Appl. No.: 09/259,435

(22) Filed: Mar. 1, 1999

(30) Foreign Application Priority Data

Mar. 3, 1998 (DE) .............................................. 198 08 825

(51) Int. Cl.[7] ........................................................ G01B 5/16

(52) U.S. Cl. ............................................ 702/155; 33/503

(58) Field of Search ............................. 702/155, 94, 150; 33/503, 1, 504, 505, 544, 543, 550, 551, 557, 558, 560, 561, 1 M; 73/162, 199, 536, 537, 573; 408/13

(56) References Cited

U.S. PATENT DOCUMENTS 4,761,891 * 8/1988 Sugimura ................................. 33/503
4,805,314 * 2/1989 Hayashi et al. ......................... 33/503
5,571,222 * 11/1996 Ludwig .................................. 33/199

* cited by examiner

Primary Examiner—Marc S. Hoff
Assistant Examiner—Edward Raymond
(74) Attorney, Agent, or Firm—Reed Smith LLP

(57) ABSTRACT

A process and arrangement for measuring taper threads on a coordinate measurement device are disclosed. The device is outfitted with a table adjustable in the X, Y and Z coordinates for receiving a specimen provided with the taper thread and which also comprises a feeler probe which is held at a spring clip with a measurement sleeve and at which a sensing is arranged. A calibration of the feeler probe is initially carried out. After the calibration, the sensing element is brought into contact with different thread flanks one after the other for the purpose of measuring the taper thread. The measurement values so determined are stored in an evaluating unit and the characteristic values and fundamental quantities of the taper thread are calculated on the basis of the stored measurement values. The steps of the process generally include taring the spring clip, defining a reference plane, arranging the specimen on the table support surface and carrying out the sensing of a thread turn, displacing the measurement sleeve and reading off and storing a first value pair, sensing another thread turn and similarly reading off and storing a second pair of values on the same diameter side of the taper thread, obtaining further value pairs from the diametrically opposite diameter side and determining the flank diameters of the taper thread and taper angle error.

9 Claims, 2 Drawing Sheets

PROCESS AND ARRANGEMENT FOR THE MEASUREMENT OF TAPER THREADS ON A COORDINATE MEASUREMENT DEVICE

BACKGROUND OF THE INVENTION a) Field of the Invention

The invention is directed to a process for measuring taper threads on a coordinate measurement device which is outfitted with a table adjustable in the X, Y and Z coordinates for receiving a specimen provided with the taper thread and which further comprises a feeler probe which is held at a spring clip such that its position is adjustable in the Z direction and which is connected by this spring clip with a measurement sleeve which is adjustable in the X direction and at which is arranged a sensing element which can be deflected in the X coordinate, wherein a calibration of the feeler probe is initially carried out with reference to a setting gage, wherein, after calibration, the sensing element is brought into contact with different thread flanks one after the other for the purpose of measuring the taper thread, the measurement values determined in this way are stored in an evaluating unit and the characteristic values and fundamental quantities of the taper thread are calculated on the basis of the stored measurement values.

b) Description of the Related Art

The invention is especially suited for determining the flank diameter of taper threads. The flank diameter is determined in a testing plane which is at a determined distance from an end face of the specimen; DIN 158 (metric tapered external thread) and DIN 2999 (Withworth pipe thread), among others, are taken into account.

DIN 158 and DIN 2999 set forth the characteristic values and fundamental quantities for tapered external thread and, at the same time, provide directions for a simple and direct functional testing of this thread. Suggestions are made for the construction and handling of gages by which the fundamental quantities of a taper thread can be tested. For this purpose, there are provided taper thread ring gages or thread plug gages which only enable testing of the thread, but not measurement of the thread.

For example, the flank diameter of a taper thread can be determined in that a plug gage with a cylindrical thread is screwed into a tapered internal thread; the value of the flank diameter must then be derived from the screw-in depth in a corresponding measurement plane. The flank diameter cannot be exactly determined in this way.

Further, it is known to use the three-wire method, as it is called, to measure tapered external threads. This method is described, for example, in Langsdorf, "Messen von Gewinde [Measurement of Thread]", Springer-Verlag Berlin, Heidelberg, New York, 1974, pages 69 to 74, and in Zill, "Messen and Lehren im Maschinen-und Feingerätebau [Measurement and Gaging in Mechanical and Precision Instrument Engineering]", Deupner Verlagsgesellschaft, Leipzig 1956, pages 183 and 184.

This measurement process has the disadvantage of being quite time-consuming because, in addition to the thread measuring wire set, it requires thread measurement balls of identical diameter and associated centering sleeves which must be fitted to the complementing spindle.

A process and an arrangement for measuring taper thread on a coordinate measurement device is known from DE-PS 44 10 195.3. In this case, after a measurement feeler has been calibrated, the specimen is clamped on the coordinate table by means of a calibrating ring. The table is tiltable and is initially adjusted in such a way that a first flank diameter line of the taper thread is oriented parallel to the Z coordinate. In this position, the thread is sensed repeatedly in different Z coordinates. The inclination of the table is subsequently changed in such a way that a second flank diameter line located diametrically opposite to the first flank diameter line is oriented parallel to the Z coordinate. In this case, also, the thread turns are sensed repeatedly in different Z positions. Measurement values are determined for every instance of sensing and are stored in an evaluating device. The characteristic values and fundamental quantities of the taper thread are determined from the stored measurement values based on known geometric relationships. A disadvantage in this process consists in that the table must be tiltable, which requires an additional articulation axis for its bearing support and, to this extent, involves the risk of inaccuracy due to manufacturing tolerances.

A process and a device for the measurement of tapered external thread are known from the German Patent 195 22 276 C1. In this case, a single-coordinate measurement device is provided for carrying out the process, wherein the specimen with the thread to be measured is received on a slide which is adjustable in three coordinate axes and is sensed by a feeler probe arranged at the measurement sleeve of the single-coordinate measurement device. It is disadvantageous that the process and device described above are not suitable for the measurement of internal thread.

OBJECT AND SUMMARY OF THE INVENTION

It is the primary object of the invention to further develop the known process for measuring taper threads on a coordinate measurement device in such a way that fundamental quantities of external taper thread and internal taper thread can be determined precisely and effectively.

This object is met for the measurement of taper threads according to a process of the type described above in that the spring clip is initially tared in a first step following the calibration in such a way that two coincidence marks which are associated with the Z coordinate, wherein one coincidence mark is arranged so as to be movable with the spring clip in the Z coordinate and the other coincidence mark is arranged so as to be stationary, are offset relative to one another in the Z direction, i.e., after taring, the distance between the movable coincidence mark and the table support surface should be less than the distance between the stationary coincidence mark and the table support surface.

A reference plane is then defined in a second step. For this purpose, the table is adjusted in the Z direction until the table support surface contacts the sensing element and the table, carrying the sensing element and spring clip along with it, is advanced further in the Z direction until the two coincidence marks coincide; the Z value of the table position which has accordingly been reached is stored as a reference valve $z_A$ or the Z position that has been reached is set at 0, so that it is easy to adjust to this table position again. The table support surface accordingly represents the reference plane for the measurement as soon as the table position reaches the reference value $z_A$.

In a subsequent, third step, the table is moved back from the sensing element until there is sufficient distance between the table support surface and the sensing element for placement of the specimen on the table support surface. After the specimen is placed, a thread turn is sensed by the sensing element in that the measurement sleeve is displaced in the X direction and the sensing element is adjusted to the arrest point or reversal point at the specimen circumference by displacing the table in the Y direction. The table is subsequently adjusted in the Z direction until the coincidence marks coincide on the spring clip.

After this, in a fourth step, the measurement sleeve is displaced further in the X direction until the sensing element has reached its zero position; in this position, a first value pair $x_1$, $z_1$ is read off and stored, wherein $x_1$ is the display value at the measurement sleeve (in the x direction) and $z_1$ is the table position in the Z coordinate.

In a fifth step, another thread turn is now sensed on the same diameter side of the taper thread and a second pair of values $x_2$, $z_2$ is similarly read off and stored.

Subsequently, in a sixth step, further value pairs $x_3$, $z_3$ and $x_4$, $z_4$ are obtained from the diametrically opposite diameter side. In the following seventh step, the flank diameter of the taper thread and, if necessary, the taper angle error are determined by means of the evaluating unit based on the geometric relationships of the value pairs $x_1$, $z_1$ to $x_4$, $z_4$.

Therefore, it is possible to determine measurement values and calculate the characteristic values and fundamental quantities of the taper thread from these measurement values in a simple manner and with high accuracy.

In order to ensure high accuracy, the value pairs $x_1$, $z_1$ to $x_4$, $z_4$ should be taken by probes close to the measurement plane defined for the taper thread.

A process for measuring taper threads of the type mentioned above, but with a table which is additionally rotatable about the Z coordinate, lies within the scope of the invention. In a first step following calibration, the spring clip is again initially tared in such a way that the two coincidence marks are offset relative to one another in the Z direction, so that, in this case again, the distance between the movable coincidence marks and the table support surface is less than the distance between the stationary coincidence mark and the table support surface.

In a second step, the measurement plane defined for the taper thread is adjusted to a distance a from the table support surface. For this purpose, the table is displaced in the Z direction while carrying the feeler probe along with it until the two coincidence marks of the spring clip lie opposite one another, and the table is subsequently moved back in the Z direction out of this position by distance $\Delta z=a$; the Z position that has now been reached by the table is read off and stored as a reference value $z_B$. As an alternative to storing the Z position, a stop can also be adjusted to make it easier to relocate the table position at reference value $z_B$.

In a third step, the specimen is fastened to the table support surface centrically relative to the axis of rotation of the table, the reference value $z_B$ is adjusted again, and the table is moved into the position marked by the stop and a first thread turn is sensed by displacing the measurement sleeve in the X direction with the sensing element.

After this, in a fourth step, an iterative change in the relative position of the specimen and sensing element is carried out by rotating the table about the Z coordinate, by readjusting the measurement sleeve in the X direction, and by displacing the table with the specimen in the Y direction until, first, the coincidence marks are located opposite one another again, second, a Y position is reached in which the sensing element is adjusted to the reversal point on the specimen circumference, and, third, the sensing element has reached its zero position. The display value of the measurement sleeve is now read off and stored as measurement value $x_1$ associated with the first thread turn.

In a fifth step, the measurement sleeve is adjusted in the X direction and the Z position is changed by $+P/2$ and $-P/2$ (where P is the pitch of the taper thread) until a second and third diametrically opposite thread turn are sensed. When the coincidence marks are located opposite one another, a Y position has been reached in which the sensing element is adjusted to the reversal point on the circumference of the specimen and the sensing element has reached its zero position, the display values of the measurement sleeve are read off and stored as measurement values $x_2$ and $x_3$ associated with the sensed thread turns.

Finally, in a further step, the corresponding flank diameter is determined by $D=D_{21}/2+D_{22}/2$ from the relationships $|x_1-x_2|=D_{21}$ and $|x_1-x_3|=D_{22}$, wherein the feeler constant and the contact ratios of the sensing element in the thread must be accounted for, as is conventional.

The carrying along of the feeler probe during the table displacement when adjusting the measurement plane defined for the taper thread in the second process step can be carried out, for example, by using a gage block. The gage block has a height $E=a-d_K/2$ between its two measurement surfaces, where a is the distance of the measurement plane from the table support surface and $d_K$ is the diameter of the ball at the sensing element. The gage block is placed with one of its measurement surfaces on the table support surface, while the second measurement surface faces the sensing element; the table is now moved in the Z direction until the second measurement surface contacts the sensing element and then further in the Z direction while carrying along the sensing element and feeler probe until the two coincidence marks of the spring clip are located opposite one another.

As an alternative to the use of a gage block, the measurement plane defined for the taper thread can also be adjusted in that the table is advanced in the Z direction until the table support surface has reached the sensing element and the table is then advanced farther, carrying the sensing element along with it, until the two coincidence marks of the spring clip are located opposite one another; the table is then moved out of this position again in the opposite direction by distance $\Delta z_1=a-d_K/2$. The table support surface is accordingly located in the position corresponding to the reference value $z_B$.

The invention is suitable for measuring tapered internal threads as well as tapered external threads. If tapered internal threads are measured, for example, it is advantageous to use a calibrating ring as a setting gage for the purpose of calibrating the feeler probe prior to measurement. This calibrating ring is arranged, instead of the specimen, on the table support surface and is sensed at a plurality of diametrically opposite positions on its circumference by the feeler probe, wherein the sensing element is adjusted to the reversal point at the circumference of the calibrating ring by displacing the table in the Y direction, and a feeler constant is calculated from the determined measurement data and is stored.

The subject matter of the invention further comprises an arrangement for carrying out the process steps mentioned above which is outfitted with a table that is displaceable along the X, Y, Z coordinate axes, the specimen provided with the taper thread being arranged on the support surface of this table.

For this purpose, a feeler probe is provided at the coordinate measurement device, wherein the feeler probe is held at a spring clip such that its position is adjustable in the Z direction. It is connected, via this spring clip, with a measurement sleeve which is adjustable in the X direction and has a sensing element which can be deflected in the X direction and which can be brought into contact with different thread flanks of the taper thread one after the other during measurement.

The feeler probe is connected with an evaluating device via a signal path by which information about the deflection of the sensing element reaches the evaluating device. The sensing element can be deflected in both directions in the X coordinate proceeding from a zero position.

Further, means are provided for monitoring the change in position of the feeler probe or sensing element during its movement in the Z direction, which means are, for example, coincidence marks, wherein one coincidence mark is arranged so as to be movable with the spring clip in the Z coordinate and the other coincidence mark is arranged so as to be stationary. In order to improve reproducibility and/or monitoring of coincidence, a dial indicator or a zero indicator can be provided and connected, via signal paths, with the evaluating device.

In order to detect the X-position value of the measurement sleeve and to adjust and monitor Z-position values of the table, measurement value receivers are provided whose signal outputs are likewise connected with the evaluating device.

As an alternative to a measurement arrangement for the Z-position values of the table, a stop system with good reproducibility can be provided, by means of which the table can always be quickly moved into the functionally important position again, for example, when the table support surface should occupy the reference value $z_B$.

The invention will be described more fully hereinafter with reference to an embodiment example for measuring an internal taper thread.

DESCRIPTION OF THE PREFERRED EMBODIMENTS

Figure 1:
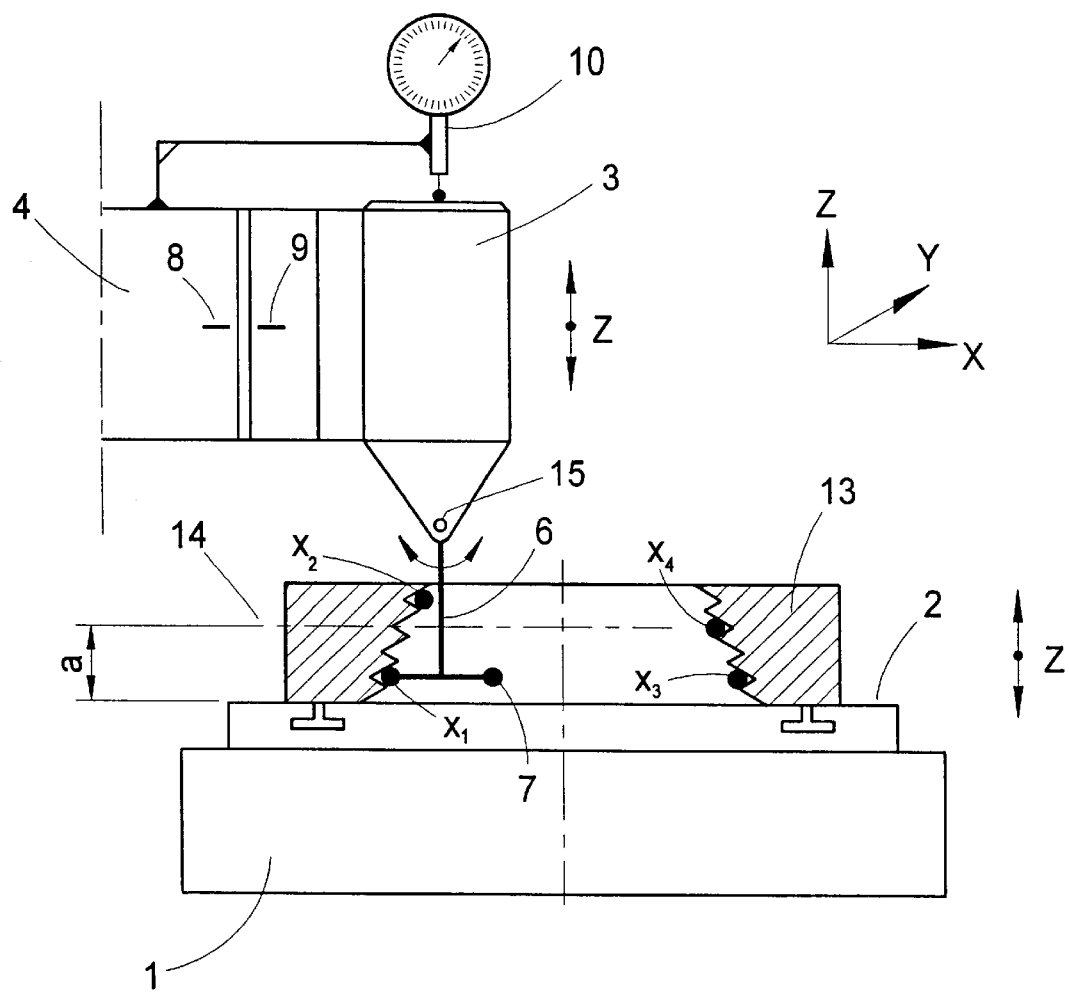
FIG. 1 the arrangement of a specimen with internal taper thread on the coordinate table.

FIG. 1 shows the table 1 belonging to a coordinate measurement device with a table support surface 2. The table 1 is displaceable in the X, Y and Z coordinates. The forward feed paths and forward feed positions of the table 1 and table support surface 2 in the Z direction can be determined and reproduced by means of a measurement arrangement such as is conventional in coordinate tables. The measurement arrangement has a measurement value receiver (not shown) whose output is connected with an evaluating device (likewise not shown).

A feeler probe 3 which is held at a spring clip 4 so as to be changeable with respect to position in the Z direction is arranged above the table 1. The feeler probe 3 is connected, via the spring clip 4, with a measurement sleeve 5 which is adjustable in the X direction. The measurement sleeve 5 is coupled with a measurement value receiver (not shown) for position values in the X direction, wherein the latter communicates with the evaluating device via a signal path.

The feeler probe 3 has a sensing element 6 which can be deflected in both directions of the X coordinate about a swiveling axis 15 proceeding from a zero position. The sensing element 6 is outfitted with sensing balls 7. The feeler probe 3 is also connected with the evaluating device via a signal path; information about the degree of deflection of the sensing element 6 reaches the evaluating device via this signal path.

Two coincidence marks 8 and 9 are arranged at the spring clip 4. Coincidence mark 8 is stationary with respect to the frame, while coincidence mark 9 is movable with the spring clip 4 in the Z coordinate. A dial indicator 10 whose measurement direction is oriented in the Z coordinate is positioned over the feeler probe 3 for exact monitoring of changes in position of the feeler probe 3 relative to the frame of the coordinate measurement device in the Z direction. The dial indicator 10 is also connected with the evaluating device via a signal path.

The evaluating unit comprises a measurement value storage, a computing circuit for processing the measurement value and for calculating the characteristic values and fundamental quantities of the taper threads and also a display device for displaying the determined results. The evaluating unit can comprise a commercially available device for detecting and evaluating measurement values, wherein the signal inputs of this device are connected to corresponding signal outputs of the feeler probe 3, dial indicator 10, measurement value receiver at the measurement sleeve 5 and measurement arrangement for the Z positions of the table 1. Measurement value receivers of different constructions can be provided.

Before beginning the measurement process according to the invention, the feeler probe 3 is calibrated with reference to a setting gage. If an internal taper thread is to be measured, for example, a calibrating ring can be used as a setting gage. The calibrating ring is first arranged on the table support surface 2 in place of the specimen 13 and is sensed at a plurality of diametrically opposite positions along its circumference with the feeler probe 3. In so doing, the sensing element 6 is adjusted to the reversal point at the circumference of the calibrating ring by displacing the table in the Y direction. A feeler constant is calculated from the determined measurement data and is stored for later use.

Following the calibration, in further preparation for the process according to the invention, the spring clip 4 is initially tared in such a way that the distance of the movable coincidence mark 9 from the table support surface 2 is less than the distance between the stationary coincidence mark 8 and the table support surface 2.

A reference plane is now defined in that the table 1 is adjusted in the Z direction until the table support surface 2 contacts the sensing element 6 and the table 1, carrying the sensing element 6 along with it, is then advanced further in the Z direction until the two coincidence marks 8, 9 coincide. The Z value of the table position that has been reached is stored as a reference valve $z_A$ or the Z position that has been reached is set at 0.

A specimen 13 with the internal taper thread to be measured is now positioned on the table support surface 2. By displacing the measurement sleeve 5 in the X direction, a first thread turn is now sensed, so that a value pair $x_1, z_1$ is detected first.

In addition, the sensing ball 7 is iteratively contacted in the selected thread turn, the sensing element 6 and sensing ball 7 are adjusted to the reversal point on the specimen circumference by displacing the table in the Y direction, and, further, it is ensured by adjusting the table 1 in the Z direction that the coincidence marks 8 and 9 at the spring clip 4 coincide. The measurement sleeve 5 is now further displaced in the X direction until the sensing element 6 has reached its zero position. In this configuration, the respective value $x_1$ is read off at the measurement arrangement connected to the measurement sleeve 5 and the respective value $z_1$ is read off at the measurement arrangement for the table displacement in the Z direction, and these values are stored as value pair $x_1$, $z_1$.

In an analogous manner, a second thread turn is sensed on the same diameter side of the internal taper thread and the value pair $x_2$, $z_2$ is read off and stored for this thread turn.

Subsequently, two additional value pairs $x_3$, $z_3$ and $x_4$, $z_4$ are obtained from the diametrically opposite diameter side. The flank diameter $D_2$ of the taper thread and, if required, the taper angle error are determined from the total of four value pairs $x_1$, $z_1$ to $x_4$, $z_4$ on the basis of the known geometric relationships. In order to achieve correct measurements, the feeler constant and the contact ratios of the sensing ball 7 in the thread turn are taken into account, as is conventional, when determining these characteristic values and fundamental quantities of the taper thread.

Figure 2:
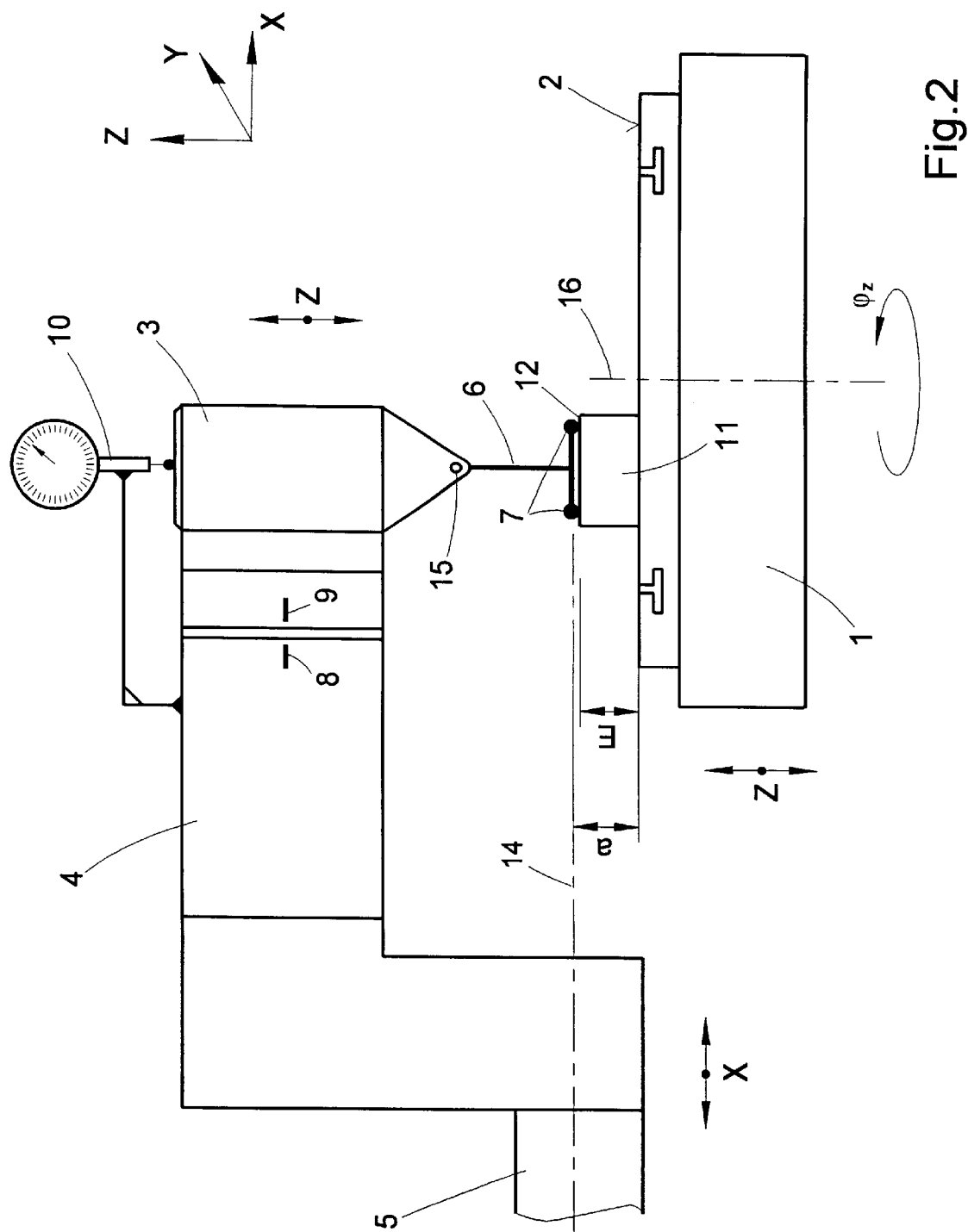
FIG. 2 an arrangement for a construction variant of the process according to the invention.

FIG. 2, by way of example, shows an arrangement which is suitable for measuring taper threads corresponding to a variant of the process according to the invention. In this case, the measurement takes place on a coordinate table which is adjustable in the X, Y and Z coordinates and is, in addition, rotatable about an axis of rotation 16 lying in the Z coordinate by an angle $\phi_Z$.

In order to adjust a reference plane for this process variant, a gage block 11, for example, is positioned on the table support surface 2. The gage block 11 has a height $E = a - d_K/2$ between its two measurement surfaces, where a is the distance between the measurement plane to be adjusted and the table support surface 2, and $d_K$ is the diameter of a sensing ball 7 at the sensing element 6. The gage block 11 is placed with its first measurement surface on the table support surface 2 and with its second measurement surface 12 facing the sensing element 6.

The table 1 is now moved in the Z direction toward the feeler probe 3 and the sensing element 6 until the second measurement surface 12 of the gage block 11 contacts one or, depending on the construction of the sensing element 6, both sensing balls 7. The continued displacement of the table 1 is then carried out while carrying along the sensing element 6 and feeler probe 3 until the two coincidence marks 8 and 9 lie opposite one another at the spring clip 4. The z value of the table position which is achieved in this way is stored as a reference value $z_B$; thus, the table support surface 2 is subsequently always again located in the reference plane when the position of the table 1 is adjusted to the reference value $z_B$.

The table 1 is now moved back opposite to the preceding forward feed direction, the gage block 11 is removed from the table support surface 2, and a specimen is arranged in its place. Further, as was described in detail in the description of the invention relating to the process steps, measurement values $x_1$ to $x_3$ are obtained and stored and the flank diameter is determined from the equations $|x_1-x_2|=D_{21}$ and $|x_1-x_3|=D_{22}$ by $D=D_{21}/2+D_{22}/2$, wherein the feeler constant and the contact ratios of the sensing element at the thread turn are to be taken into account.

While the foregoing description and drawings represent the preferred embodiments of the present invention, it will be obvious to those skilled in the art that various changes and modifications may be made therein without departing from the true spirit and scope of the present invention.

| Reference Numerals | |
|---|---|
| 1 | table |
| 2 | table support surface |
| 3 | feeler clip |
| 4 | spring clip |
| 5 | measurement sleeve |
| 6 | sensing element |
| 7 | sensing ball |
| 8, 9 | coincidence marks |
| 10 | dial indicator |
| 11 | gage block |
| 12 | measurement surface |
| 13 | specimen |
| 14 | measurement plane |
| 15 | swiveling axid |
| 16 | axis of rotation |
| a | distance |
| $x_1 \ldots x_4$ | measurement positions |
| $\psi_z$ | rotational angle |

What is claimed is:

1. A process for measuring taper threads on a coordinate measurement device which is outfitted with a table adjustable in the X, Y and Z coordinates for receiving a specimen provided with the taper thread and which further comprises a feeler probe which is held at a spring clip such that its position is adjustable in the Z direction and which is connected by this spring clip with a measurement sleeve which is adjustable in the X direction and at which is arranged a sensing element which can be deflected in the X coordinate, wherein a calibration of the feeler probe is initially carried out with reference to a setting gage, wherein, after calibration, the sensing element is brought into contact with different thread flanks one after the other for the purpose of measuring the taper thread, the measurement values determined in this way are stored in an evaluating unit and the characteristic values and fundamental quantities of the taper thread are calculated on the basis of the stored measurement values, comprising the steps of:

initially taring the spring clip in a first step following the calibration in such a way that two coincidence marks which are associated with the Z coordinate, wherein one coincidence mark is arranged so as to be movable with the spring clip in the Z coordinate and the other coincidence mark is arranged so as to be stationary, are offset relative to one another in the Z direction, wherein the distance between the movable coincidence mark and the table support surface is less than the distance between the stationary coincidence mark and the table support surface;

in a second step, defining a reference plane by adjusting the table in the Z direction until the table support surface contacts the sensing element and the table, carrying the sensing element along with it, is advanced further in the Z direction until the two coincidence marks coincide, and the Z value of the table position which has accordingly been reached is stored as a reference valve $z_A$ or the Z position that has been reached is set at 0;

in a third step, arranging the specimen on the table support surface and carrying out the sensing of a thread turn by displacement of the measurement sleeve in the X direction, the sensing element being adjusted to the reversal point at the specimen circumference by displacing the table in the Y direction, and the coincidence marks are subsequently made to coincide on the spring clip by adjusting the table in the Z direction;

in a fourth step, displacing the measurement sleeve further in the X direction until the sensing element has reached its zero position and, in this position, a first value pair $x_1$, $z_1$ is read off and stored, wherein $x_1$ is the display value at the measurement sleeve and $z_1$ is the table position in the Z coordinate;

in a fifth step, sensing another thread turn on the same diameter side of the taper thread and similarly reading off and storing a second pair of values $x_2$, $z_2$;

in a sixth step, further obtaining value pairs $x_3$, $z_3$ and $x_4$, $z_4$ from the diametrically opposite diameter side; and, finally, in a seventh step, determining the flank diameters of the taper thread and the taper angle error by the evaluating unit from the geometric relationships of the value pairs $x_1$, $z_1$ to $x_4$, $z_4$, wherein the feeler constant and the contact ratios of the sensing element in the thread are to be taken into account.

2. The process according to claim 1, wherein the value pairs $x_1$, $z_1$ to $x_4$, $z_4$ are taken by probes close to the measurement plane defined for the taper thread.

3. A process for measuring taper threads employing the preamble of claim 1, but with a table which, in addition to being displaceable in the X, Y, Z coordinates, is mounted so as to be rotatable about the Z coordinate, comprising the steps of:

in a first step following calibration, taring the spring clip in such a way that two coincidence marks which are associated with the Z coordinate;

wherein one coincidence mark is arranged so as to be movable with the spring clip in the Z coordinate and the other coincidence mark is arranged so as to be stationary, are offset relative to one another in the Z direction, wherein the distance between the movable coincidence mark and the table support surface is less than the distance between the stationary coincidence mark and the table support surface;

in a second step, adjusting the measurement plane defined for the taper thread to a distance a from the table support surface in that the table, carrying the feeler probe along with it, is displaced in the Z direction until the two coincidence marks of the spring clip lie opposite one another, and the table is subsequently moved back in the Z direction out of this position by the distance $\Delta z=a$, whereupon the Z position that has now been reached by the table is read off and stored as a reference value $z_B$ or a stop is adjusted for this position;

in a third step, fastening the specimen to the table support surface centrically relative to the axis of rotation of the table, adjusting the reference value $z_B$ again, and sensing a first thread turn by displacing the measurement sleeve in the X direction with the sensing element;

in a fourth step, the relative position of the specimen and sensing element is changed in an iterative manner by rotating the table about the Z coordinate, by readjusting the measurement sleeve in the X direction, and by displacing the table with the specimen in the Y direction until, first, the coincidence marks are located opposite one another again, a Y position is reached in which the sensing element is adjusted to the reversal point on the specimen circumference, and the sensing element has reached its zero position, whereupon the display value of the measurement sleeve is read off and stored as measurement value $x_1$ associated with the first thread turn;

in a fifth step, adjusting the measurement sleeve in the X direction and changing the Z position by +P/2 and/or −P/2 (where P is the pitch of the taper thread) until a second and third diametrically opposite thread turn are sensed, the coincidence marks are located opposite one another again, a Y position is reached in which the sensing element is adjusted to the reversal point on the circumference of the specimen, and the sensing element has reached its zero position, whereupon the display values of the measurement sleeve are read off and stored as measurement values $x_2$ and $x_3$ associated with the sensed thread turns; and, finally, in a further step, determining the corresponding flank diameter by $D=D_{21}/2+D_{22}/2$ from the relationships $|x_1-x_2|=D_{21}$ and $|x_1-x_3|=D_{22}$, wherein the feeler constant and the contact ratios of the sensing element in the thread are to be taken into account.

4. The process according to claim 3, wherein, for the purpose of adjusting the measurement plane defined for the taper thread, the carrying along of the feeler probe and, therefore, also the sensing element in the Z adjustment is carried out by means of a gage block which has a height $E=a-d_K/2$ between its two measurement surfaces, where a is the distance of the measurement plane from the table support surface and $d_K$ is the diameter of the sensing ball at the sensing element, wherein a first measurement surface is placed on the table support surface and the second measurement surface faces the sensing element, whereupon the table is moved until the second measurement surface contacts the sensing element and is then further displaced until the two coincidence marks of the spring clip are located opposite one another.

5. The process according to claim 3, wherein, for the purpose of adjusting the measurement plane defined for the taper thread, the carrying along of the feeler probe and the sensing element in the Z adjustment is carried out by direct contact of the table support surface and the sensing element, wherein the table support surface is advanced in the Z direction until the table support surface has reached the sensing element, the sensing element lies on the table support surface and is then advanced further until the two coincidence marks of the spring clip are located opposite one another, and the table is moved out of this position again in the opposite direction by distance $\Delta z=a-d_K/2$, where a is the distance of the measurement plane from the table support surface and $d_K/2$ is half of the diameter of the sensing ball.

6. The process according to claim 1, wherein a calibrating ring is used as a setting gage for the purpose of calibrating the feeler probe prior to measurement of an internal taper thread, wherein the calibrating ring is arranged, instead of the specimen, on the table support surface and is sensed at a plurality of diametrically opposite positions on its circumference by the feeler probe, wherein the sensing element is adjusted to the reversal point at the circumference of the calibrating ring by displacing the table in the Y direction, and a feeler constant is calculated from the determined measurement data and is stored.

7. An arrangement for carrying out a process as set forth in claim 1, comprising:

a table that is displaceable along the X, Y, Z coordinate axes, the specimen provided with the taper thread being arranged on the support surface of said table;

a feeler probe which is arranged at the coordinate measurement device, held at a spring clip such that its position is adjustable in the Z direction, and connected, via this spring clip, with a measurement sleeve which is adjustable in the X direction and has a sensing element which can be deflected in the X direction and which can be brought into contact with different thread flanks of the taper thread one after the other during measurement;

an evaluating device with which the feeler probe is connected via signal paths;

a measurement arrangement for determining the position values of the sensing element during movement in the X direction;

a measurement arrangement for determining the X-position values of the measurement sleeve; and means for adjusting and monitoring Z-position values of the table support surface.

8. The arrangement according to claim 7, wherein a measurement arrangement for the Z-position values or a stop system with good reproducibility is provided as means for adjusting and monitoring the Z-position values of the table support surface.

9. The arrangement according to claim 7, wherein a dial indicator or a zero indicator is provided for improving the reproducibility of the adjustment of the coincidence marks at the spring clip.

* * * * *